(12) United States Patent
Nainar et al.

(10) Patent No.: US 10,177,995 B2
(45) Date of Patent: Jan. 8, 2019

(54) SCALABLE SERVICE LEVEL AGREEMENT (SLA) VERIFICATION AND ACTION USING A DATA PLANE

(71) Applicant: Cisco Technology, Inc., San Jose, CA (US)

(72) Inventors: Nagendra Kumar Nainar, Morrisville, NC (US); Carlos M. Pignataro, Raleigh, NC (US); Joseph M. Clarke, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 168 days.

(21) Appl. No.: 15/219,678

(22) Filed: Jul. 26, 2016

(65) Prior Publication Data

US 2018/0034712 A1   Feb. 1, 2018

(51) Int. Cl.
*H04L 12/26* (2006.01)
*H04L 12/24* (2006.01)

(52) U.S. Cl.
CPC ...... *H04L 41/5019* (2013.01); *H04L 41/5009* (2013.01); *H04L 43/0829* (2013.01); *H04L 43/106* (2013.01); *H04L 43/087* (2013.01)

(58) Field of Classification Search
CPC ............. H04L 41/5019; H04L 43/0829; H04L 43/106
See application file for complete search history.

(56) References Cited

U.S. PATENT DOCUMENTS

| 6,363,053 | B1* | 3/2002 | Schuster ............. H04L 41/5003 370/230 |
| 6,512,746 | B1* | 1/2003 | Sand ..................... H04L 41/147 370/252 |
| 6,792,459 | B2  | 9/2004 | Elnozahy et al. |
| 6,836,466 | B1* | 12/2004 | Kant ....................... H04L 29/06 370/232 |
| 7,487,240 | B2* | 2/2009 | Proulx .................... H04L 41/00 709/220 |
| 7,680,074 | B2  | 3/2010 | Xu et al. |
| 8,793,363 | B2* | 7/2014 | Sater ....................... H04L 67/36 709/224 |
| 9,100,299 | B2* | 8/2015 | Krzanowski ........ H04L 43/0811 |
| 2004/0153533 | A1* | 8/2004 | Lewis ..................... H04L 41/00 709/223 |

(Continued)

OTHER PUBLICATIONS

Zhu, et al., "Packet-Level Telemetry in Large Datacenter Networks," Proceedings of the 2015 ACM Conference on Special Interest Group on Data Communication, Oct. 2015, pp. 479-491.

(Continued)

*Primary Examiner* — Chi H Pham
*Assistant Examiner* — Fahmida S Chowdhury
(74) *Attorney, Agent, or Firm* — Edell, Shapiro & Finnan, LLC

(57) ABSTRACT

An ingress node inserts into a header of a packet service level agreement information and forwards the packet. At an egress node of the network, the packet is received and the service level agreement information is obtained from the header of the packet. The egress node verifies whether there is conformance to a service level agreement based on at least one parameter associated with reception of one or more packets at the egress node and the service level agreement information.

20 Claims, 11 Drawing Sheets

(56) References Cited

U.S. PATENT DOCUMENTS

| | | | |
|---|---|---|---|
| 2008/0031146 A1* | 2/2008 | Kwak | H04L 41/5003 |
| | | | 370/250 |
| 2011/0158105 A1* | 6/2011 | Duffield | H04L 43/0823 |
| | | | 370/242 |
| 2013/0051332 A1* | 2/2013 | Sridhar | H04W 48/06 |
| | | | 370/329 |
| 2013/0159479 A1* | 6/2013 | Vasseur | H04L 47/10 |
| | | | 709/221 |
| 2014/0129444 A1 | 5/2014 | LeRoy | |
| 2016/0330111 A1* | 11/2016 | Manghirmalani | H04L 43/028 |

OTHER PUBLICATIONS

Cisco, "Configuring Cisco IOS IP SLAs Operations," Catalyst 4500 Series Switch Cisco IOS Software Configuration Guide, Release 12.2(44)SG, Mar. 27, 2008, Chapter 49, 14 pages.

* cited by examiner

SCALABLE SERVICE LEVEL AGREEMENT (SLA) VERIFICATION AND ACTION USING A DATA PLANE

The present disclosure relates to inband service level agreement (SLA) verification.

BACKGROUND

Network service providers are expected to provide differentiated levels of service according to service level agreements (SLAs). Currently, SLA verification measures latency, including jitter and delay, by using an out-of-band mechanism and sending synthetic probe packets that are independent of production data flows. While an effort is made to resemble production traffic, such as voice or video, an actual path that the production traffic takes, based on hashing, could differ from a path of out-of-band traffic. Latency could be related to a characteristic of a specific flow, a specific path, a specific size, etc., which may not be detected by an out-of-band probe packet. Consequently, during SLA verification, an exact service level achieved by a specific user may not be determined.

Network analytics is a key area for monetization of a network. For example, the NetFlow™ technology is used for collecting network and flow related information, which is periodically uploaded to a network management server for analytics. The analytics may be used for real-time service assurance. Federating such distributed data in order to perform real-time and predictive service assurance is difficult to achieve on a per-flow basis. For ease and scalability, real-time and predictive service assurance checks for any resource constraints, and if a predefined threshold is breached, a link/path will be excluded. However, per-flow visibility is not possible.

DESCRIPTION OF EXAMPLE EMBODIMENTS

Overview

An ingress node inserts into a header of a packet service level agreement information and forwards the packet. At an egress node of the network, the packet is received and the service level agreement information is obtained from the header of the packet. The egress node verifies whether there is conformance to a service level agreement based on at least one parameter associated with reception of one or more packets at the egress node and the service level agreement information.

EXAMPLE EMBODIMENTS

Figure 1:
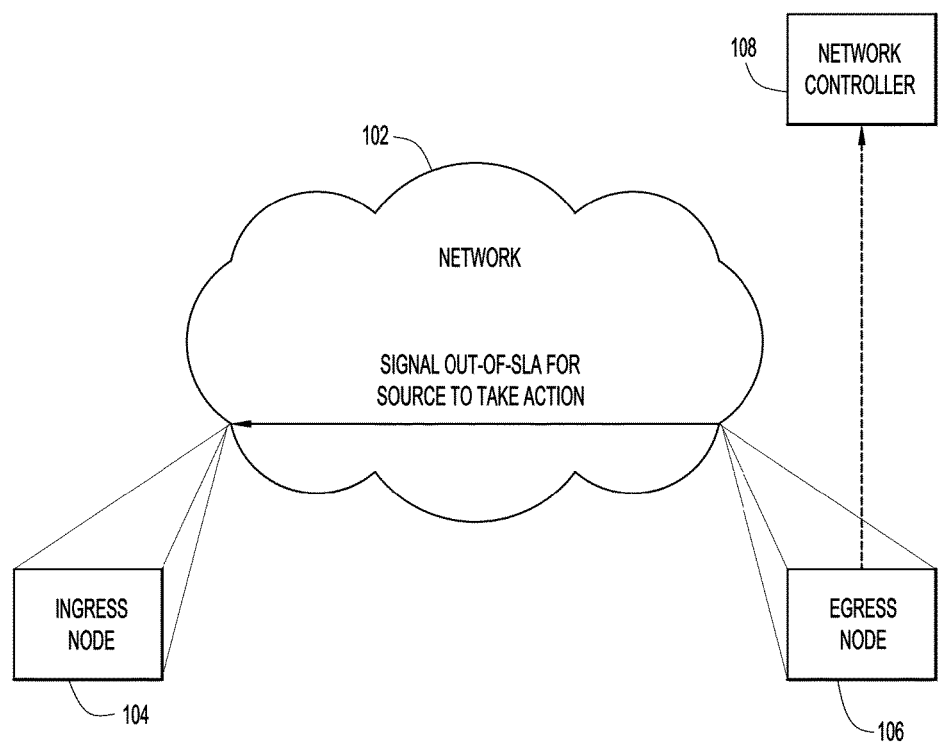
FIG. 1 illustrates an example of a network environment in which the inband SLA verification techniques presented herein may be employed, according to an example embodiment.

FIG. 1 illustrates an example of an environment 100 in which the various embodiments presented herein may be deployed. The environment includes a network 102 of which there is an ingress node 104 and egress node 106. There are numerous other nodes in the network 102 that are not shown for simplicity. According to embodiments presented herein, the ingress node 104 generates packets according to flow information and inserts expected or agreed-upon SLA information into headers of one or more packets of a packet flow. The expected SLA information may include agreed-upon delay (latency), jitter, packet loss, etc. Delay (latency) is measured in terms of end-to-end (ingress-to-egress) time taken for a packet to travel. Jitter is a variation on delay and measures the delay over various packets, and compares the delay differences. Packet loss is a measure of drops of packets, and is commonly reflected as a percentage (packet loss percentage). In accordance with the techniques presented herein, the egress node will measure delay/latency for packets. The egress node can additionally compute jitter (over a plurality of packets) as well as packet loss by comparing an in-packet carried sequence number value to an expected sequence number of a received packet. In any case, the expected SLA information (whether it is delay, jitter, packet loss, etc.) is inserted into at least one packet that is sent from the ingress node into the network and for reception by the egress node.

The flow information may be 5-tuple-based (e.g., source IP address/port number, destination IP address/port number and the protocol of a Transmission Control Protocol/Internet Protocol (TCP/IP) connection), Quality of Service (QoS)-based (precedence/Differentiated Services Code Point (DSCP)), ingress interface-based, or Virtual Routing and Forwarding (VRF)-based, etc.

The ingress node 104 may receive a packet that is part of a flow that matches a SLA requirement policy (i.e., a packet that is part of a flow to be monitored for SLA compliance) and may append to the packet, as part of a packet header, the expected SLA information. In embodiments that operate in an IP version 6 environment, the packet header may be an extension header. In other embodiments, the packet header may be a network service header. The ingress node 104 may then forward the packet into network 102 where it eventually reaches the egress node 106.

The above-described actions of the ingress node 104 could be considered as a Service Function Chaining paradigm where the egress node 106 serves as a Service Function Forwarder hosting a Service Function that is responsible for performing network analytics such as, for example, SLA verification.

When the egress node 106 receives the packet and determines, based on the expected SLA information in the header, that the packet failed SLA verification, the egress node 106 may send a notification to the ingress node 104 and/or to a network controller 108 indicating that the packet failing the SLA verification. The notification signaling may be accomplished by using either an out-of-band mechanism or an inband Operation, Administration and Maintenance (OAM) mechanism.

Upon receiving the notification, the ingress node 104 or the network controller 108 could take a number of different actions, some of which may include, but not be limited to, triggering a Fast Retransmit and Recovery (FRR) or increasing a metric on a Provider Edge (PE) to Customer Edge (CE) link to redirect traffic.

In some embodiments, the notification may be sent to network controller 108, or to a centralized management server (not shown) for accounting purposes.

Integration with application endpoints is also possible. For example, the egress node 106 or the network controller 108, upon knowing an application within a flow, may signal an originating endpoint or a controller of the originating endpoint (for a voice or video call) to throttle transmission, change codecs, or perform another action. Further details and use cases will become more apparent in connection with the following description.

Figure 2:
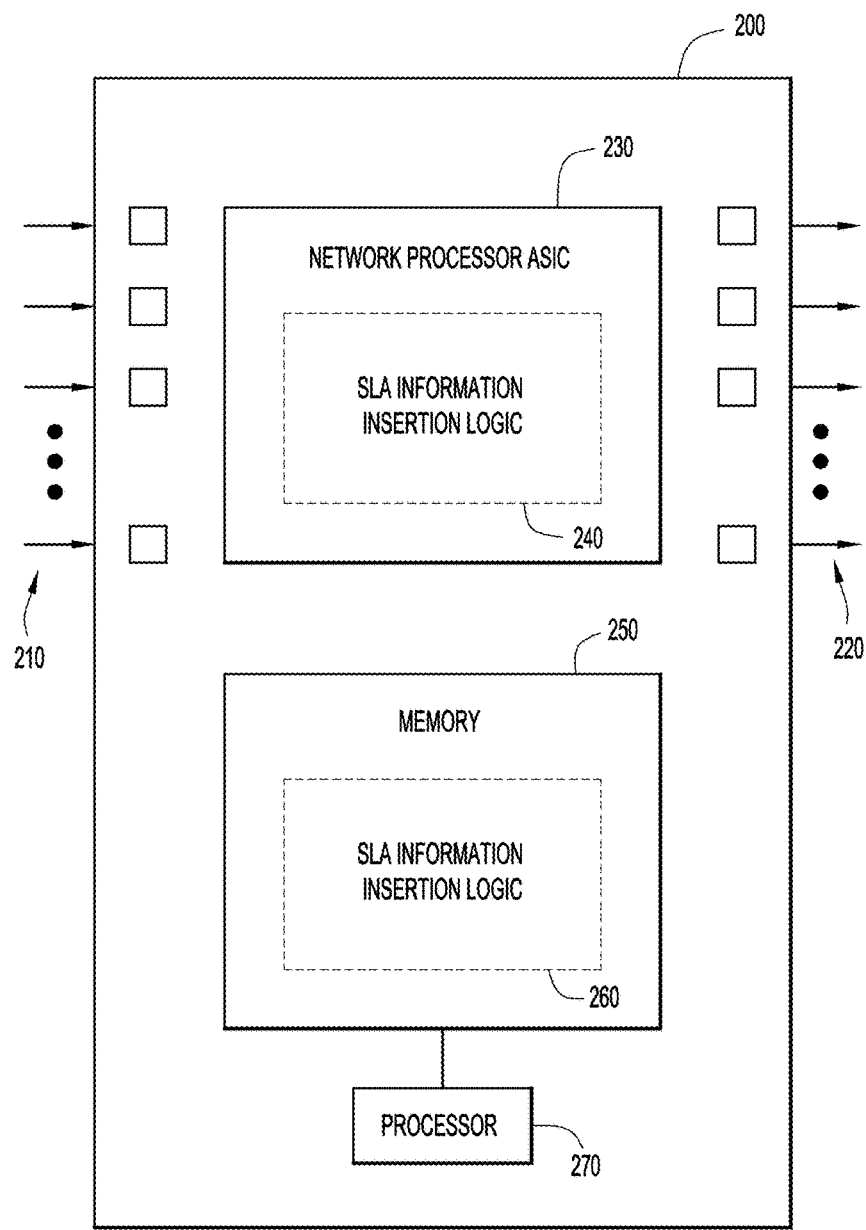
FIG. 2 illustrates an example ingress node configured to participate in the inband SLA verification techniques, according to an example embodiment.

FIG. 2 illustrates a block diagram of an ingress node, shown at reference numeral 200. The ingress node 200 includes input ports 210 and output ports 220. In one embodiment, the ingress node 200 includes a network processor Application Specific Integrated Circuit (ASIC) 230, or multiple such ASICs. Network processor ASIC 230 may include fixed digital logic, programmable logic, or a combination thereof. For example, network processor ASIC 230 may include fixed or programmable digital logic integrated circuits, in which digital logic gates are configured to perform instructions of SLA information insertion logic 240. Network processor ASIC 230 may further include memory (not shown) and fixed or programmable digital logic for networking functions, such as switching, routing, etc.

The ingress node 200 may include network processor ASIC 230 or memory 250 or both network processor ASIC 230 and memory 250. The ingress node 200 may further include one or more processors 270. Memory 250 may include SLA information insertion logic 260.

The one or more processors 270 may be one or more microprocessors or microcontrollers configured to execute program logic instructions, such as SLA information insertion logic 260, for carrying out various operations and tasks described herein. For example, the one or more processors 270 may execute SLA information insertion logic 260 stored in memory 250 (as e.g., software) in order to perform SLA information insertion techniques described herein. Memory 250 may include read only memory (ROM), random access memory (RAM), magnetic storage media, optical storage media, flash memory, electrical, or other physical/tangible (non-transitory) memory.

The functions of one or more processors 270 may be implemented by logic encoded in one or more non-transitory tangible computer readable media, wherein memory 250 may store data used for operations described herein and may store software or processor executable instructions that are executed to carry out the operations described herein.

SLA information insertion logic 260 may take any of a variety of forms, so as to be encoded in one or more non-transitory tangible computer readable memory media or storage device (e.g., memory 250) for execution, such as fixed logic or programmable logic (e.g., software/computer instructions executed by a processor).

Figure 3:
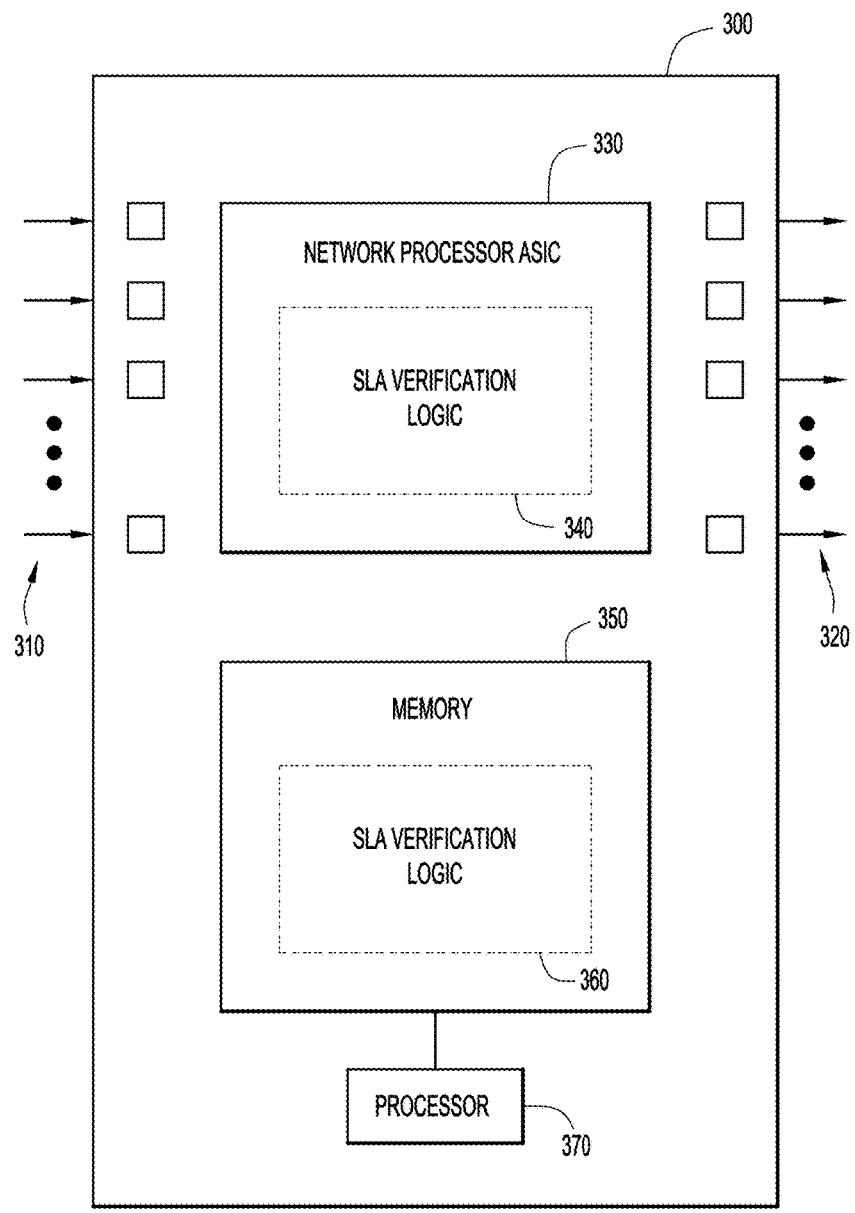
FIG. 3 shows an example egress node configured to participate in the inband SLA verification techniques, according to an example embodiment.

FIG. 3 illustrates a block diagram of an egress node shown at reference numeral 300. The egress node 300 may include input ports 310 and output ports 320. In one embodiment, the egress node 300 includes a network processor ASIC 330, or multiple such ASICs. Network processor ASIC 330 may include fixed digital logic, programmable logic, or a combination thereof. For example, network processor ASIC 330 may include fixed or programmable digital logic integrated circuits, in which digital logic gates are configured to perform instructions of SLA verification logic 340. Network processor ASIC 330 may further include memory (not shown) and fixed or programmable digital logic for networking functions, such as switching, routing, etc.

The egress node 300 may include network processor ASIC 330 or memory 350 or both network processor ASIC 330 and memory 350. The egress node 300 may further include one or more processors 370. Memory 350 may include SLA verification logic 360.

The one or more processors 370 may be one or more microprocessors or microcontrollers configured to execute program logic instructions such as SLA verification logic 360 for carrying out various operations and tasks described herein. For example, one or more processors 370 can execute SLA verification logic 360 stored in memory 350 (as e.g., software) in order to perform SLA verification techniques described herein. Memory 350 may include ROM, RAM, magnetic storage media, optical storage media, flash memory, electrical, or other physical/tangible (non-transitory) memory.

The functions of one or more processors 370 may be implemented by logic encoded in one or more non-transitory tangible computer readable media, wherein memory 350 may store data used for operations described herein and may store software or processor executable instructions that are executed to carry out the operations described herein.

SLA verification logic 360 may take any of a variety of forms, so as to be encoded in one or more non-transitory tangible computer readable memory media or storage device (e.g., memory 350) for execution, such as fixed logic or programmable logic (e.g., software/computer instructions executed by a processor).

Figure 4:
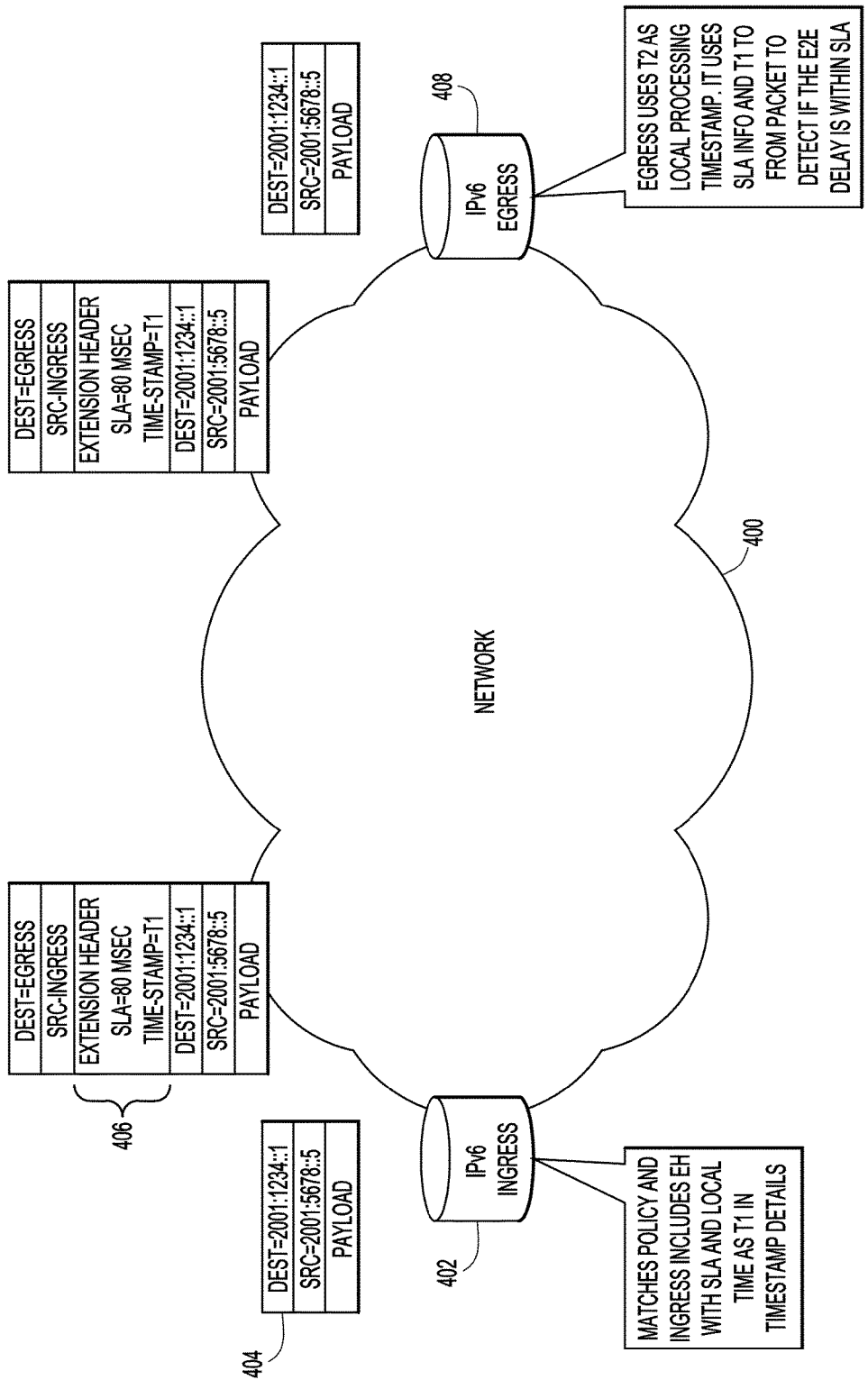
FIG. 4 illustrates SLA information carried inband in an Internet Protocol, version 6, header, according to an example embodiment.
Figure 5:
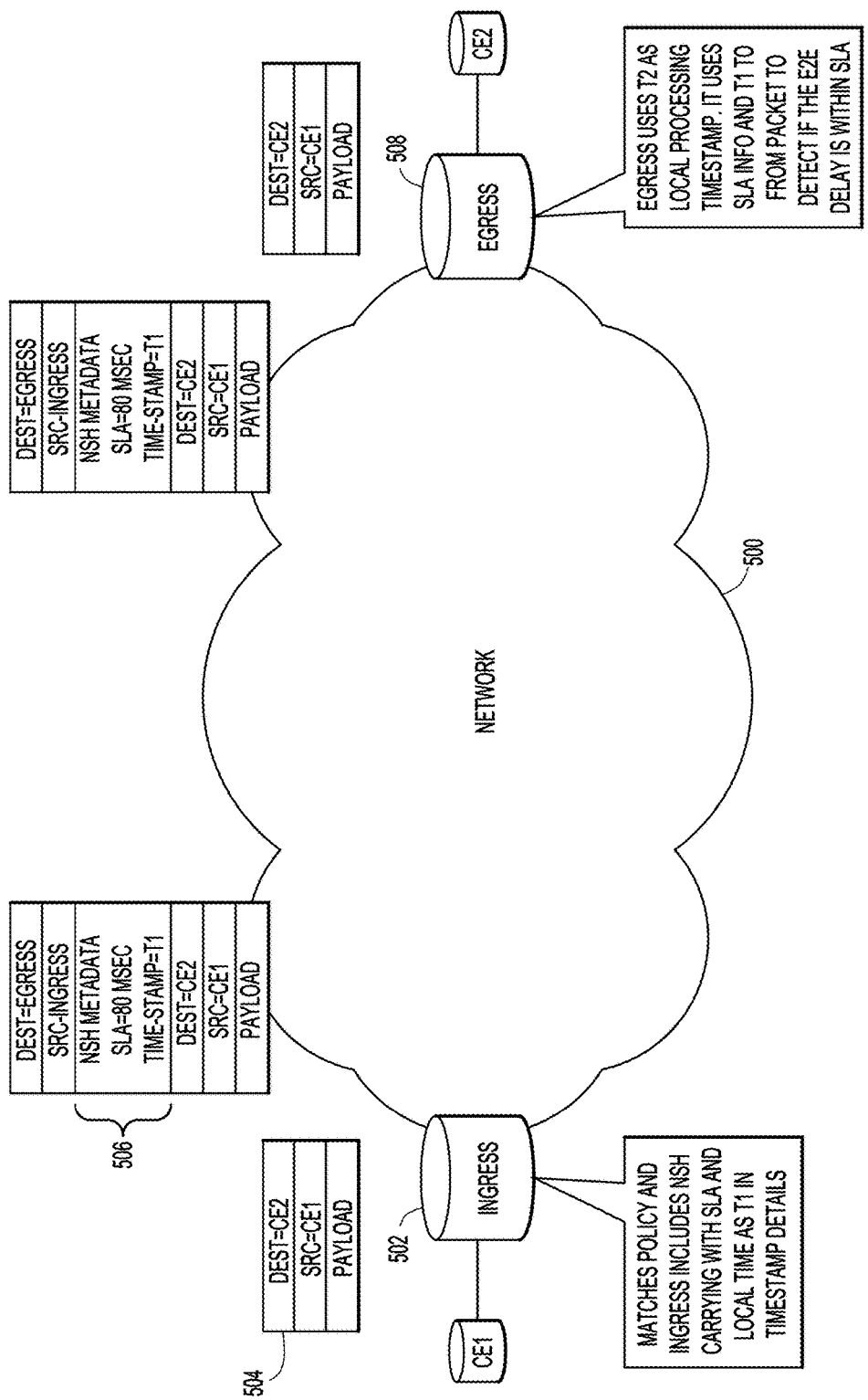
FIG. 5 illustrates SLA information carried inband in a network service header, according to an example embodiment.

FIGS. 4 and 5 illustrate example topologies for various embodiments of the inband SLA verification techniques. FIG. 4 illustrates a topology in an IP version 6 environment. FIG. 5 illustrates a topology in an environment that uses a network service header. FIGS. 4 and 5 depict an example in which the SLA expectation information is related to latency/delay. This is only by way of example and is not meant to be limiting.

In FIG. 4, a network 400 is shown that includes an ingress node 402. The ingress node 402 receives a packet 404 that is part of a flow for which SLA verification is to be made. The packet 404 includes source address information, destination address information and a payload. Upon determining that the received packet 404 matches the SLA requirement policy, the ingress node 402 may append an IP version 6 extension header 406 to the packet 404. The extension header may include SLA expectation information and a first local timestamp indicating a time of departure of the packet from the ingress node. For example, the SLA expectation information is a latency of 80 msec and the first local timestamp is T1. After appending the IP version 6 extension header 406 to the packet 404, the ingress node 402 may forward the packet 404 into network 400 where it ultimately will reach an egress node. As explained above, appending the IP version 6 extension header and forwarding the packet 404 to an egress node 408 may be considered to be Service Function Chaining (SFC) with the egress node 408 as a Service Function Forwarder (SFF) hosting a Service Function (SF) that is responsible for performing network analytics such as, for example, SLA verification.

Upon receiving the packet 404 with the appended extension header 406, the egress node 408 obtains a second local timestamp, T2, the time at which the packet 404 arrives at the egress node, and verifies whether the packet conforms to SLA expectation information based on a difference between the second local timestamp and the first local timestamp and the SLA expectation. In other words, the egress node uses T2 as a local processing timestamp and determines the difference between T1 and T2 for the packet to determine if the end-to-end (ingress-to-egress) delay/latency is within the SLA expectation, e.g., 80 msec, that was inserted into the packet.

When the egress node 408 determines that the packet having the appended extension header is not verified as conforming to the SLA, the egress node 408 may send a notification indicating a failed SLA verification to the ingress node 402 or to a network controller. The notification may be sent via an out-of-band mechanism or an inband OAM mechanism.

Upon receiving the notification, the ingress node 402 or the network controller could take a number of different actions including, but not limited to, triggering a Fast Retransmit and Recovery or increasing a metric on a PE to CE link to redirect traffic.

Reference is now made to FIG. 5. FIG. 5 shows a network 500 having an ingress node 502. The ingress node 502 receives a packet 504 that is part of a flow for which SLA verification is to be made. The packet 504 includes source address information, destination address information and a payload. Upon determining that the received packet 504 matches an SLA requirement policy, the ingress node 502 may append a network service header (NSH) 506 to the packet 504. The network service header may include SLA expectation information and a first local timestamp. Again, in this example, the SLA expectation information is a latency of 80 msec and the first local timestamp is T1. After appending the network service header 506 to the packet 504, the ingress node 502 may forward the packet 504 into the network 50 where it ultimately reaches egress node 508.

Upon receiving the packet 504 with the appended network service header 506, the egress node 508 obtains a second local timestamp (T2) and verifies whether the packet conforms to the SLA based on a difference between the second local timestamp and the first local timestamp and the SLA expectation information, as described above in connection with FIG. 4.

As described above in connection with FIG. 4, when the egress node 508 determines that the packet having the appended network service header is not verified as conforming to the SLA, the egress node 508 may send a notification indicating a failed SLA verification to the ingress node 502 or to a network controller. The notification may be sent via an out-of-band mechanism or an inband OAM mechanism.

Upon receiving the notification, the ingress node 502 or the network controller could take a number of different actions including, but not limited to, triggering a Fast Retransmit and Recovery or increasing a metric on a PE to CE link to redirect traffic.

SLA verification, using either IP version 6 extension headers or network service headers, may be integrated with application endpoints. In such embodiments, upon receiving the signal, the ingress node 402, 502 or the network controller may throttle transmission, change codecs, or may perform another action.

Figure 6:
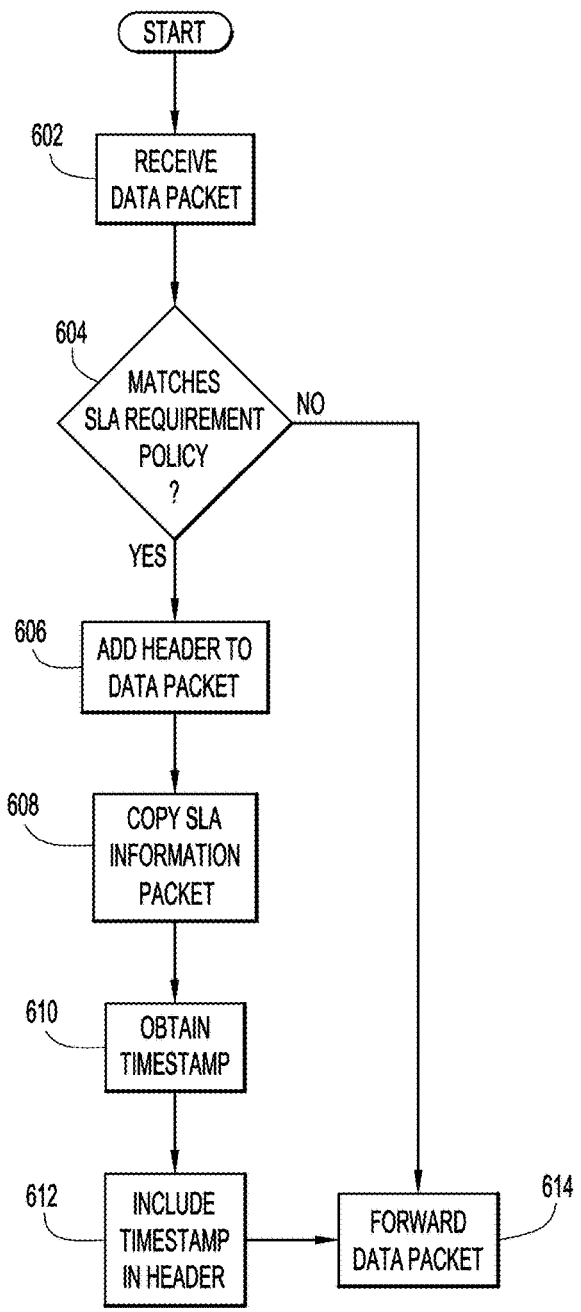
FIG. 6 is a flowchart depicting operations performed in an ingress node, according to an example embodiment.

FIG. 6 is a flowchart that illustrates example processing in various embodiments of an ingress node. At 602, the process may begin with the ingress node receiving or obtaining a packet via one of its input ports. The ingress node may then determine, at 604, whether the packet matches an SLA requirement policy. If the ingress node determines that the packet does not match the SLA requirement policy, then the packet may be forwarded into the network at 614.

At 604, if the ingress node determines that the packet matches the SLA requirement policy, then a header may be appended to the packet. The header may be an IP version 6 extension header in some embodiments and in other embodiments, the header may be a network service header.

At 608, the ingress node may copy/insert SLA information into the header appended to the packet. The SLA information may include an SLA expectation, such as latency, jitter or packet loss, for example.

When the SLA information pertains to delay or jitter, operations 610 and 612 are performed. At 610, the ingress node obtains a first local timestamp and, at 612, the ingress node may include the first local timestamp in the header. The first local timestamp represents the time that the packet is sent into the network by the ingress node.

The ingress node may then forward the packet with the appended header into the network, at 614. If the SLA information pertains to a parameter other than delay or jitter, such as packet loss, then operations 610 and 612 are not necessary, but sequence numbers are included in packets so that the egress node can determine when packets that are expected to be received (based on sequence number), are not received. This is useful for determine conformance with a SLA-based packet loss.

Figure 7:
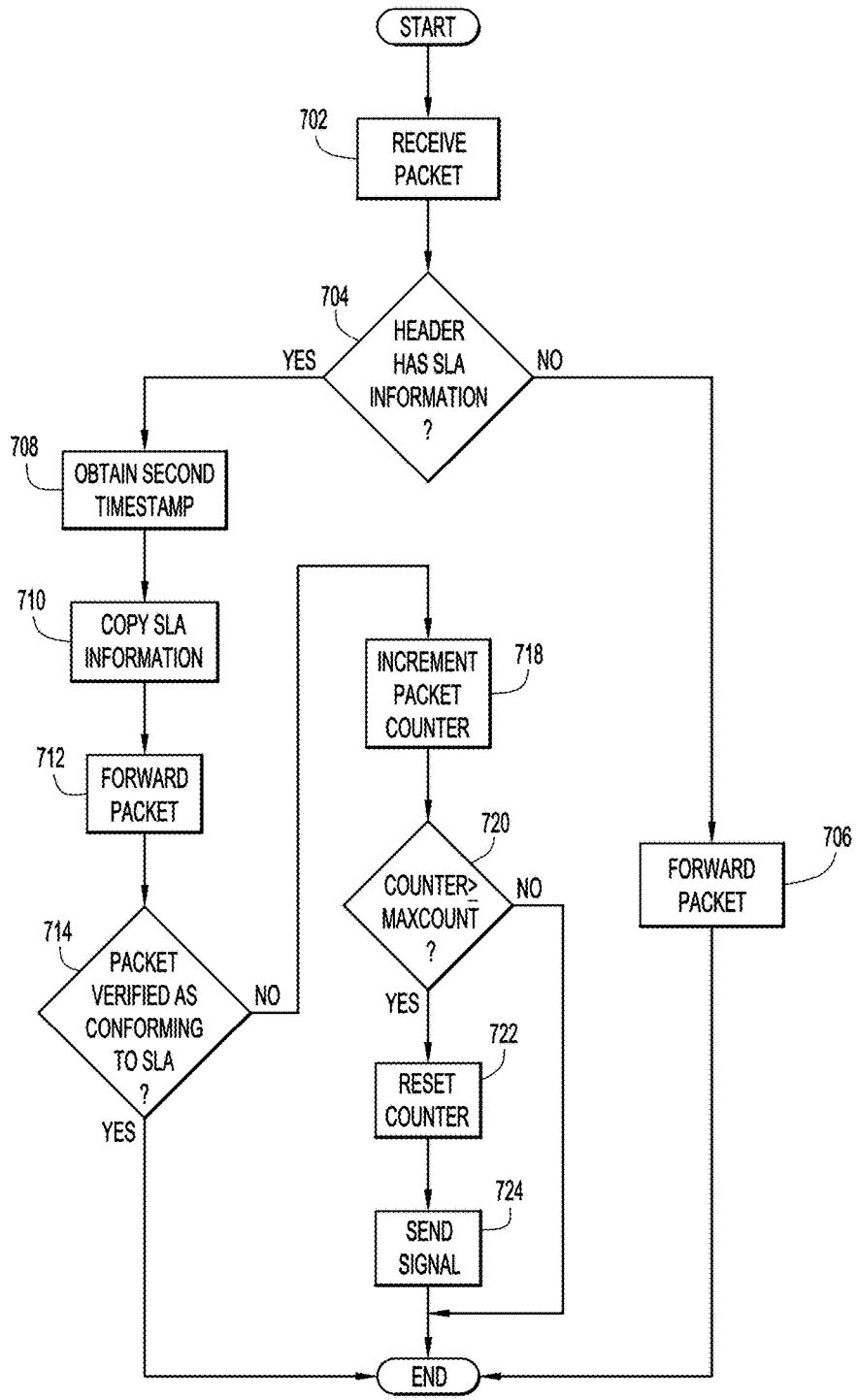
FIG. 7 is a flowchart depicting operations performed in an egress node, according to an example embodiment.

FIG. 7 is a flowchart illustrating example processing in the egress node. At 702, the egress node receives the packet (which originated at the ingress node) in the network. At 704, the egress node determines whether the packet includes a header (an IP version 6 extension header or a network service header) having stored therein SLA expectation information (and perhaps a local timestamp). If the egress node determines that the packet does not include the header having stored therein the SLA expectation information then, at 706, the packet is forwarded to a destination and the process is completed.

If the egress node determines that the packet includes the header having stored therein SLA expectation information and a local timestamp, then the following operations are performed. When the header further a local timestamp inserted by the ingress node, then at 708, the egress node may obtain a second local timestamp associated with receipt of the packet at the egress node. At 710, the egress node obtains the SLA information contained in the packet and the first local timestamp, if one is included. At 712, the packet may be forwarded to the destination.

At 714, the egress node may submit the SLA information to a local process (running at the egress node) to determine whether there is conformance to the SLA based on the SLA information obtained from the header of the packet.

The determination made at 714 depends on the type of SLA information contained in the header of the received packet. When the header of the received packet includes a first local timestamp inserted by the ingress node and the SLA information contained in the header is expected latency/delay, then the egress node uses the second timestamp (obtained at 708) associated with reception of the packet at the egress node, and determines a difference between the first local timestamp and the second local timestamp. Thus, in this example, verification of conformance to the SLA involves comparing the difference with the expected latency value contained in the header of the packet. If the difference is determined to be outside the expected latency, then the conformance of the packet to the SLA fails.

When the SLA information in the header of the packet is expected jitter, then the egress node determines differences, for a plurality of packets received at the egress node, between a first local timestamp associated with a packet sent by the ingress node and a second local timestamp associated with a packet received at the egress node. The egress computes a jitter value based on the differences, and compares the jitter value with the expected jitter. If the jitter value is outside the expected jitter, then conformance to the SLA fails.

Further still, when the SLA Information in the header of the packet is expected packet loss, the egress node determines whether and how many packets sent by the ingress node do not reach the egress node based on sequence number information contained in the packets, and the egress node computes a packet loss value, accordingly. Then egress node then compares the packet loss value with the expected packet loss, and when the packet loss value is outside the expected packet loss, conformance to the SLA fails.

When conformance to the SLA fails, a packet counter may be incremented, at 718. If, at 720, the packet counter is determined not to be greater than or equal to a predefined maximum count, then the process is completed. Otherwise, the packet counter may be reset, at 722, and a signal may be sent, at 724.

As mentioned previously, the signal may be sent to the ingress node or a network controller. In some embodiments, in which the egress node or the network controller has knowledge of an application within the flow, the egress node or the network controller may signal an originating endpoint of the application, or a network controller of the originating endpoint, to perform an action including, but not limited to, throttling transmission or changing a codec.

In some embodiments, in addition to the packet counter being reset when the packet counter becomes greater than or equal to the predefined maximum count, the packet counter may also be reset after each predefined time interval. The predefined time interval may be 10 seconds, 60 seconds, or some other time interval. In such embodiments, a signal indicating failed SLA verification will be sent every time the packet counter reaches the predefined maximum count during a predefined time interval.

Embodiments which use inband SLA verification provide a clear picture regarding whether actual data traffic is flowing according to the expected SLA. Further, SLA verification is very granular such that it could be used as: always on; selective packet based verification; or on-demand verification. As explained above, SLA verification may be based on delay (latency) measured in terms of end-to-end (ingress-to-egress) time difference of a packet, as well as jitter and packet loss. The egress node will measure delay/latency for packets. The egress node can additionally compute jitter (over a plurality of packets) as well as packet loss by comparing an in-packet carried sequence number value to an expected sequence number of a received packet. Thus, the SLA information inserted into a header of a packet at an ingress node may include expected/maximum delay/latency, expected/maximum jitter and expected/maximum packet loss.

Thus, in summary, in one form, a method is provided comprising: receiving, at an egress node of a network, a packet that includes in a header thereof service level agreement information inserted by an ingress node of the network; obtaining, by the egress node, the service level agreement information; and verifying, by the egress node, whether there is conformance to a service level agreement based on at least one parameter associated with reception of one or more packets and the service level agreement information.

In another form, an apparatus is provided comprising: a plurality of network ports of an egress node configured to receive and send packets over a network; a network processor unit coupled to the plurality of network ports and configured to determine how to direct packets with respect to the plurality of network ports; and a processor configured to: obtain, at an egress node of a network, from a header of a packet received at one of the plurality of network ports, service level agreement information inserted by an ingress node of the network, and verify whether the packet conforms to a service level agreement based on at least one parameter associated with reception of one or more packets and the service level agreement information.

In still another form, one or more non-transitory computer readable storage media are provided that are encoded with instructions, which when executed by a processor, cause the processor to perform operations comprising: receiving, at an egress node of a network, a packet that includes in a header thereof service level agreement information inserted by an ingress node of the network; obtaining, by the egress node, the service level agreement information; verifying, by the egress node, whether there is conformance to a service level agreement based on at least one parameter associated with reception of one or more packets and the service level agreement information.

In yet another form, a method is provided comprising: obtaining, at an ingress node of a network, a packet to be sent into the network; inserting into a header of the packet service level agreement information for use by an egress node of the network in verifying conformance to a service level agreement; and forwarding the packet into the network.

In still another form, an apparatus is provided comprising: a plurality of network ports of an ingress node configured to receive and send packets over a network; a network processor unit coupled to the plurality of network ports and configured to determine how to direct packets with respect to the plurality of network ports; and a processor configured to: obtain, at an ingress node of a network, a packet to be sent into the network; insert into a header of the packet service level agreement information for use by an egress node of the network in verifying conformance to a service level agreement; and forward the packet into the network.

In still another form, one or more non-transitory computer readable storage media are provided that are encoded with instructions, which when executed by a processor, cause the processor to perform operations comprising: obtaining, at an ingress node of a network, a packet to be sent into the network; inserting into a header of the packet service level agreement information for use by an egress node of the network in verifying conformance to a service level agreement; and forwarding the packet into the network.

In yet another form, a method is provided comprising: obtaining, at an ingress node of a network, a packet to be sent into the network; inserting into a header of the packet service level agreement information for use by an egress node of the network in verifying conformance to a service level agreement; forwarding the packet into the network; receiving, at the egress node the packet that includes in the header thereof service level agreement information inserted by the ingress node; obtaining, by the egress node, the service level agreement information; and verifying, by the egress node, whether there is conformance to a service level agreement based on at least one parameter associated with reception of one or more packets and the service level agreement information.

In still another form, a system is provided comprising an ingress node, an egress node, both of which are part of a network, wherein the ingress node is configured to: obtain a packet to be sent into the network; insert into a header of the packet service level agreement information for use by the egress node of the network in verifying conformance to a service level agreement; and forward the packet into the network; and wherein the egress node is configured to: receive the packet that includes in the header thereof service level agreement information inserted by the ingress node; obtain the service level agreement information; and verify whether there is conformance to a service level agreement based on at least one parameter associated with reception of one or more packets and the service level agreement information.

Label-Based Source-Triggered NetFlow and Resource Data Collection

Typically, network devices such as, for example, routers, are configured to collect and export network information. However, per-flow visibility is not generally provided. To solve this problem, control is placed on a source instead of an intermediate router. For example, an instruction may be included in a packet instead of in a router command line interface (CLI). This can be achieved by tagging a packet with a specific marking. In one embodiment, this can be accomplished by using a Multiprotocol Label Switching (MPLS) label value ("NetFlow Label" or NFL). The NFL is applicable to traditional MPLS networks and segment routing. In another embodiment, this can be achieved by using an IP version 6 Flow Label value or an IP version 6 extension header signal.

Figure 8:
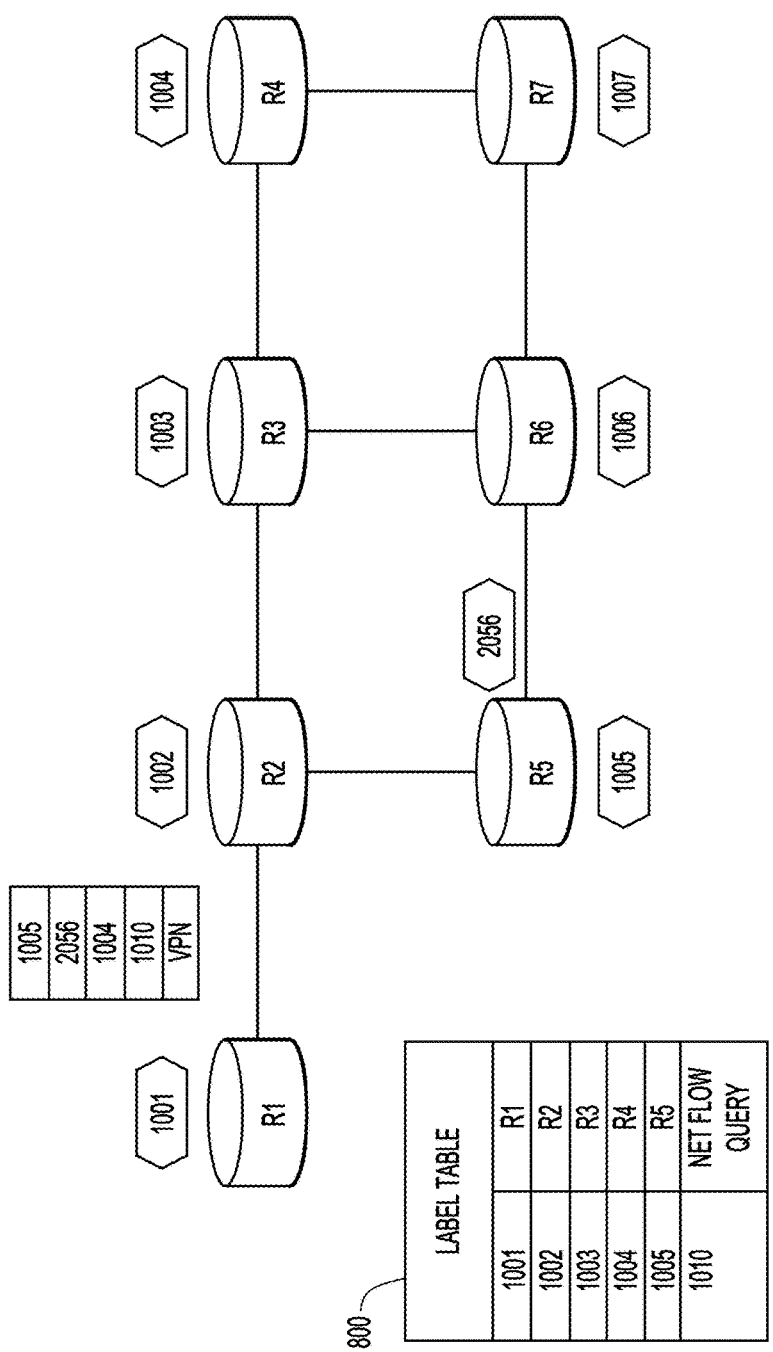
FIGS. 8 and 9 illustrate a Multiprotocol Label Switched (MPLS) label with a particular value used to trigger generation and sending of a network resource report to a server, according to an example embodiment.
Figure 9:
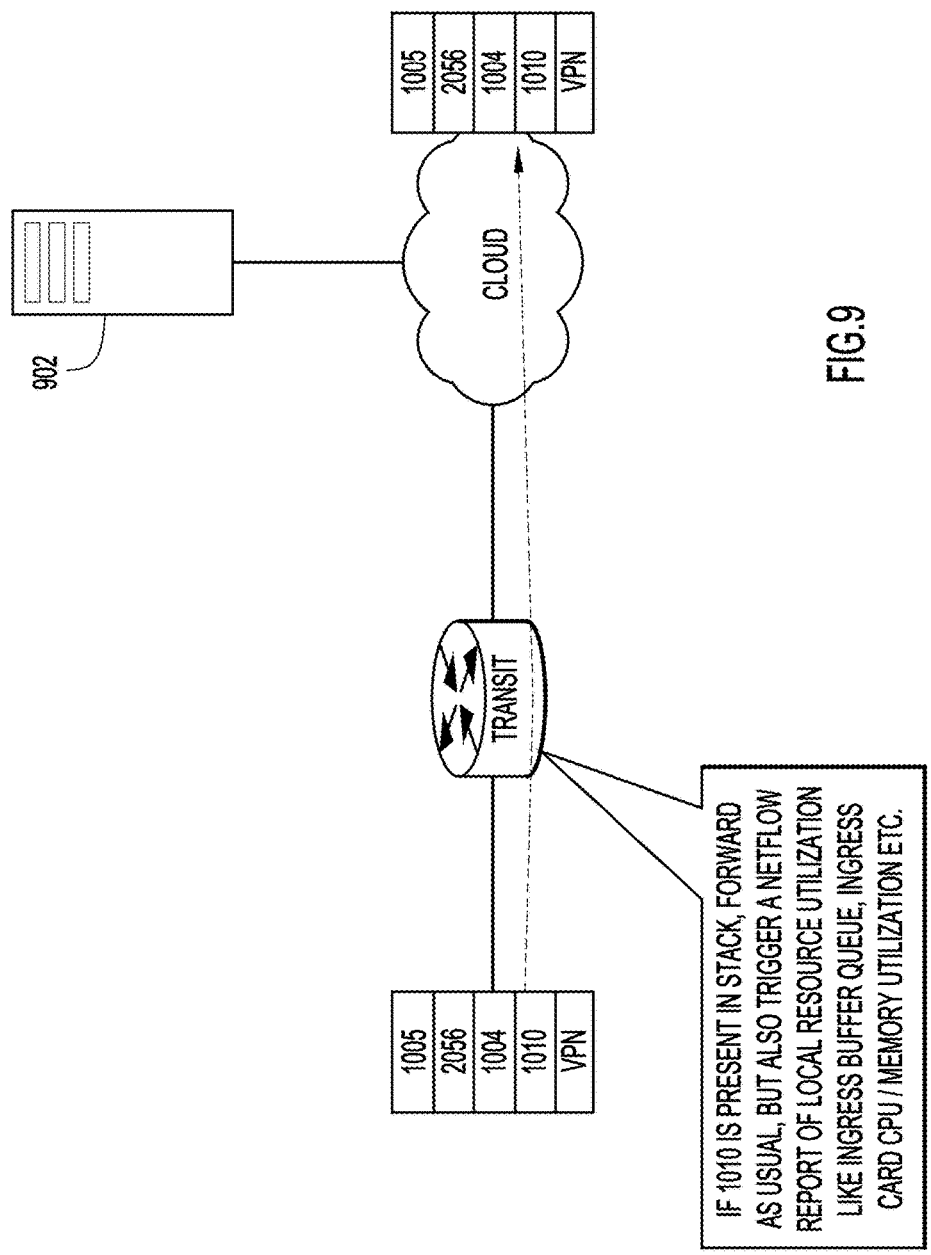

Reference is now made to FIGS. 8 and 9. FIG. 8 shows an embodiment using MPLS labels in this manner. A label table 800 of a label switch router (LSR) or transit router is shown. A value, 1010 in this example, is associated with a "NetFlow Query" behavior. Therefore, when a label having the value 1010 arrives at a transit router, in addition to forwarding a packet as usual, a network resource report is triggered and sent to a server 902, as shown in FIG. 9. The network resource report may include information such as local resource utilization of an ingress buffer queue, ingress card CPU utilization, ingress memory utilization, etc.

Although FIG. 8 depicts an embodiment using MPLS labels, the same concept may be used with respect to another embodiment that uses, for example, IP version 6 extension headers. In other words, the concept may be used with any way of tagging a packet.

Figure 10:
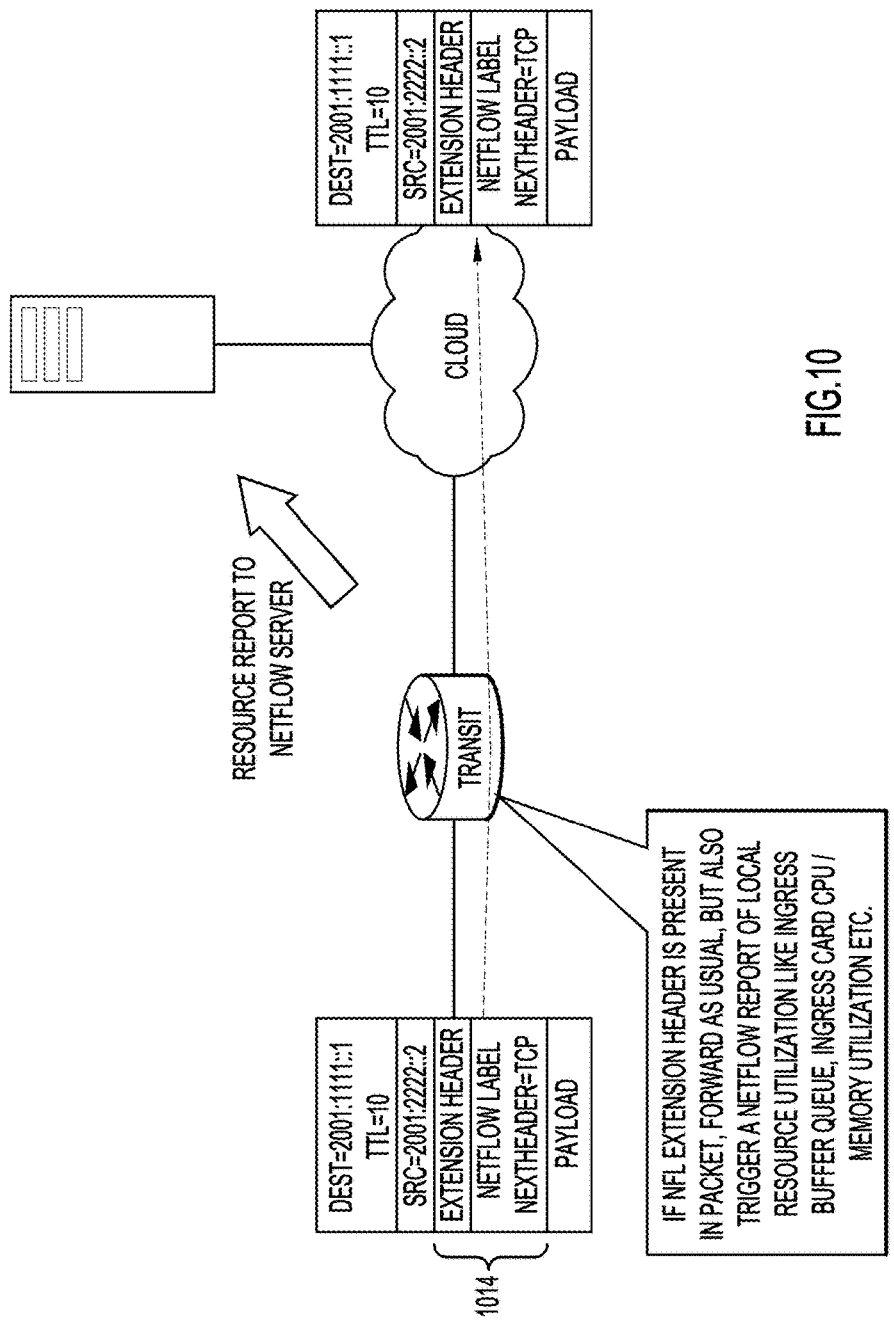
FIG. 10 is similar to FIG. 9, but illustrates use of an IP version 6 extension header with a NetFlow label to trigger a network resource report, according to an example embodiment.

FIG. 10 shows an example similar to that of FIG. 9, but using an IP version 6 extension header with NFL 1014 instead of an MPLS label.

Figure 11:
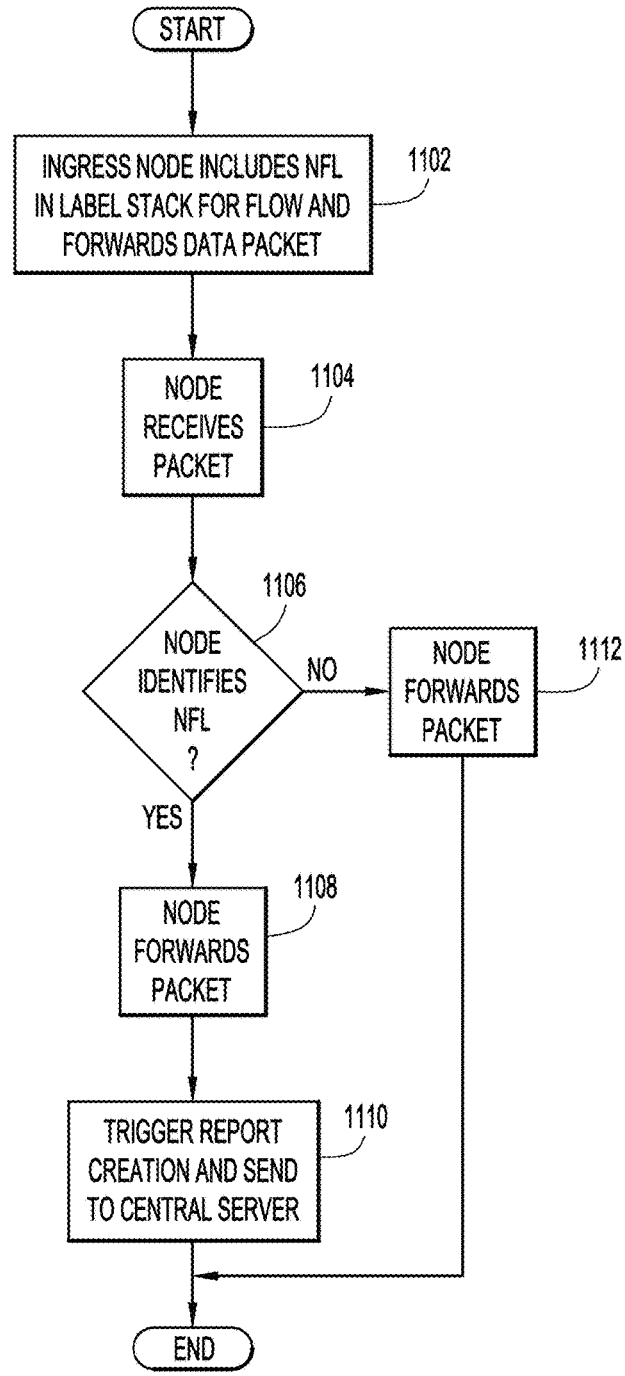
FIG. 11 is a flowchart of a process in which a packet tagged with a NetFlow label triggers generation and transmission of a network resource report, according to an example embodiment.

FIG. 11 illustrates an example process in which packets in a flow may be tagged with a NFL to trigger a network resource report. The process may begin, at 1102, with an ingress node tagging a packet with a NFL and forwarding the packet. At 1104, a node receives the packet. The node may determine whether the packet is tagged with the NFL, at 1106. If the node is not tagged with the NFL, then the packet is forwarded, at 1112, and the process may be completed. Otherwise, the node forwards the packet, at 1108, and at 1110, triggers creation of a network resource report, which then may be sent to a central server. The process may then be completed.

The sending of network reports is scalable because every packet may not include a NFL. For example, the NFL may be included in every $N^{th}$ packet, where N may be 100, 50, 200, or another number.

The central server may use network resource information to perform analytics and may perform an action if the SLA is breached or predicted to be breached based on the collected network resource information.

In some embodiments, by default, information captured by NetFlow and uploaded for real-time analytics may include: flow information such as, for example, a header tuple, protocol, etc.; packet context, which may include path information such as incoming interface, outgoing interface, stack details (e.g., MPLS or segment routing (SR) stack); and network context, which may include resource information such as CPU utilization, backplane utilization, etc.

In its most fundamental form, a static generic tag may be used including, but not limited to an MPLS label, an IP version 6 flow label, an extension header, and a Type-Length Value (TLV) within inband OAM within IP version 6 (iOAM6).

Positioning a well-defined and unique tag anywhere in a stack to trigger collection of NetFlow information introduces a new paradigm in diagnostics collection. The paradigm shifts from a device/configuration-based paradigm to a more scalable packet-based paradigm and moves control from transit devices to a source, where there is flexibility to perform a full rate/bulk collection to selective packet marking for custom or in-depth flow analysis.

The above description is intended by way of example only. Various modifications and structural changes may be made therein without departing from the scope of the concepts described herein and within the scope and range of equivalents of the claims.

What is claimed is:

1. A method comprising:
   receiving, at an egress node of a network, a packet that includes in a header thereof service level agreement information inserted by an ingress node of the network;
   obtaining, by the egress node, the service level agreement information;
   verifying, by the egress node, whether there is conformance to a service level agreement based on at least one parameter associated with reception of one or more packets and the service level agreement information; and
   sending to a network controller, by the egress node, a notification indicating when verification of the service level agreement fails.

2. The method of claim 1, wherein sending comprises sending the notification via either an out-of-band mechanism or an inband operations, administration and maintenance mechanism.

3. The method of claim 1, wherein the header of the data packet is either a network service header or an Internet Protocol extension header.

4. The method of claim 1, wherein the header of the packet further includes a first local timestamp inserted by the ingress node and the service level agreement information is expected latency, and further comprising:
obtaining, by the egress node, a second local timestamp associated with reception of the packet at the egress node; and
determining a difference between the first local timestamp and the second local timestamp;
wherein verifying comprises comparing the difference with the expected latency included in the header of the packet.

5. The method of claim 1, wherein the service level agreement information is expected jitter, and further comprising:
determining differences, for a plurality of packets received at the egress node, between a first local timestamp associated with a packet sent by the ingress node and a second local timestamp associated with a packet received at the egress node;
computing a jitter based on the differences;
wherein verifying comprises comparing the jitter with the expected jitter.

6. The method of claim 1, wherein the service level agreement information is expected packet loss, and further comprising:
determining whether and how many packets sent by the ingress node do not reach the egress node based on sequence number information contained in the packets;
computing a packet loss;
wherein verifying comprises comparing the packet loss with the expected packet loss.

7. The method of claim 1, further comprising sending to an originating endpoint or to the network controller a notification indicating that a change should be made to one or more characteristics of a packet flow sent through the network.

8. The method of claim 1, wherein the egress node serves as a service function forwarder in a service function chain, and wherein the obtaining and verifying are performed by a service function hosted by the egress node.

9. An apparatus comprising:
a plurality of network ports of an egress node configured to receive and send packets over a network;
a network processor unit coupled to the plurality of network ports and configured to determine how to direct packets with respect to the plurality of network ports; and
a processor configured to:
obtain, at an egress node of a network, from a header of a packet received at one of the plurality of network ports, service level agreement information inserted by an ingress node of the network,
verify whether the packet conforms to a service level agreement based on at least one parameter associated with reception of one or more packets and the service level agreement information; and
send to a network controller a notification indicating failed verification of the service level agreement when it is determined that conformance to the service level agreement is determined to fail.

10. The apparatus of claim 9, wherein the processor is configured to send the notification via either an out-of-band mechanism or an inband operations, administration and maintenance mechanism.

11. The apparatus of claim 9, wherein the service level agreement information includes one or more of: expected latency, expected jitter and expected packet loss.

12. The apparatus of claim 9, wherein the processor is further configured to:
before verifying whether the packet conforms to the service level agreement:
extract information included in the header,
forward the packet, and
provide the information extracted from the header to a local process that verifies whether there is conformance to the service level agreement.

13. The apparatus of claim 9, wherein the processor is further configured to send to an originating endpoint or to the network controller a notification indicating that a change should be made to one or more characteristics of a packet flow sent through the network.

14. A non-transitory computer-readable storage media encoded with software comprising computer executable instructions which, when executed by a processor at egress node of a network, cause the processor to:
receive a packet that includes in a header thereof service level agreement information inserted by an ingress node of the network;
obtain the service level agreement information;
verify whether there is conformance to a service level agreement based on at least one parameter associated with reception of one or more packets and the service level agreement information; and
send to a network controller a notification indicating when verification of the service level agreement fails.

15. The non-transitory computer-readable storage media of claim 14, wherein the instructions cause the processor to send the network controller the notification by sending the notification via either an out-of-band mechanism or an inband operations, administration and maintenance mechanism.

16. The non-transitory computer-readable storage media of claim 14, wherein the header of the data packet is either a network service header or an Internet Protocol extension header.

17. The non-transitory computer-readable storage media of claim 14, wherein the header of the packet further includes a first local timestamp inserted by the ingress node and the service level agreement information is expected latency, and the instructions further cause the processor to:
obtain a second local timestamp associated with reception of the packet at the egress node;
determine a difference between the first local timestamp and the second local timestamp; and
compare the difference with the expected latency included in the header of the packet.

18. The non-transitory computer-readable storage media of claim 14, wherein the service level agreement information is expected jitter, and the instructions further cause the processor to:
determine differences, for a plurality of packets received at the egress node, between a first local timestamp associated with a packet sent by the ingress node and a second local timestamp associated with a packet received at the egress node;
compute a jitter based on the differences; and
compare the jitter with the expected jitter.

19. The non-transitory computer-readable storage media of claim 14, wherein the service level agreement information is expected packet loss, and the instructions further cause the processor to:
- determine whether and how many packets sent by the ingress node do not reach the egress node based on sequence number information contained in the packets;
- compute a packet loss; and
- compare the packet loss with the expected packet loss.

20. The non-transitory computer-readable storage media of claim 14, wherein the instructions further cause the processor to:
- send to an originating endpoint or to the network controller a notification indicating that a change should be made to one or more characteristics of a packet flow sent through the network.

* * * * *